Aug. 23, 1955   J. ATKINSON   2,715,794
PROPAGATORS FOR RAISING PLANTS
Filed Dec. 4, 1953   2 Sheets-Sheet 1
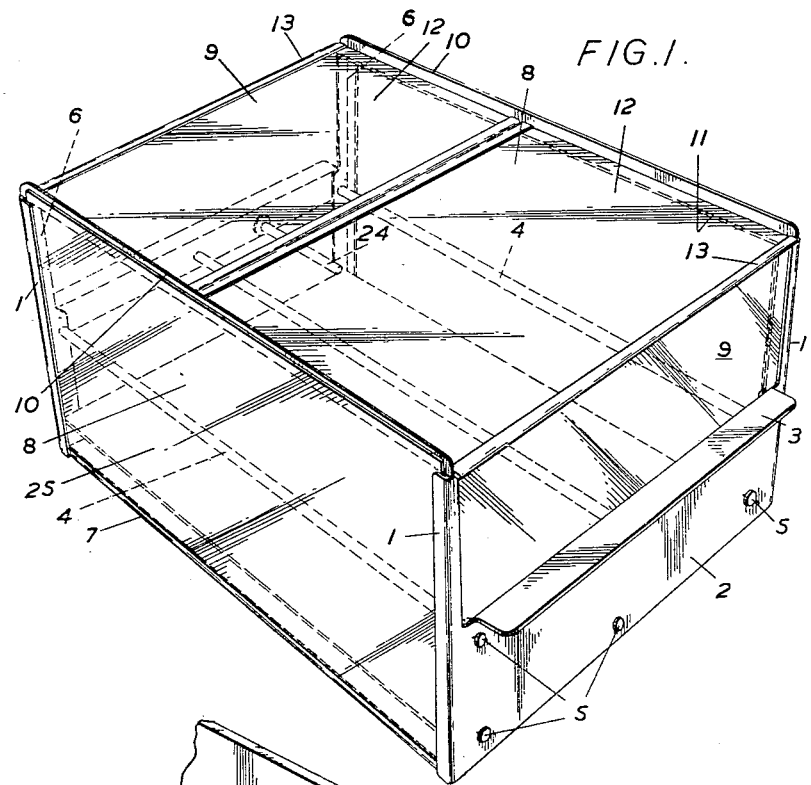
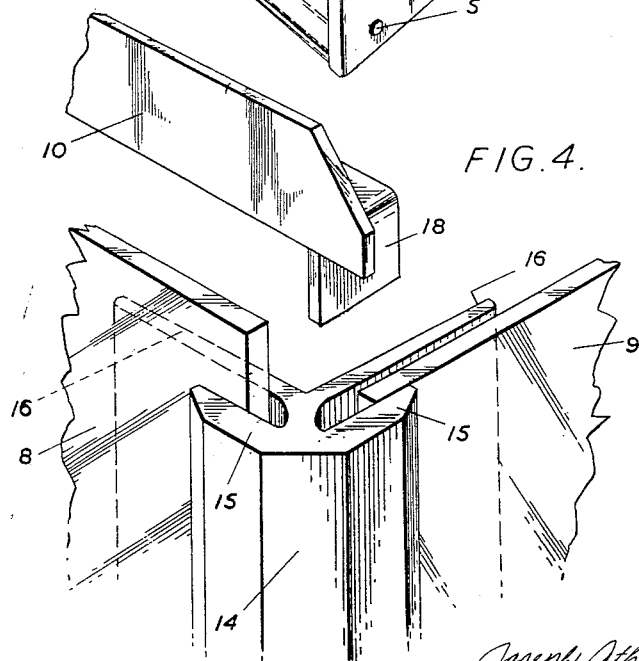
Inventor:
Joseph Atkinson
By
Smith, Michael & Gardiner Attorneys Aug. 23, 1955    J. ATKINSON    2,715,794
PROPAGATORS FOR RAISING PLANTS
Filed Dec. 4, 1953    2 Sheets-Sheet 2
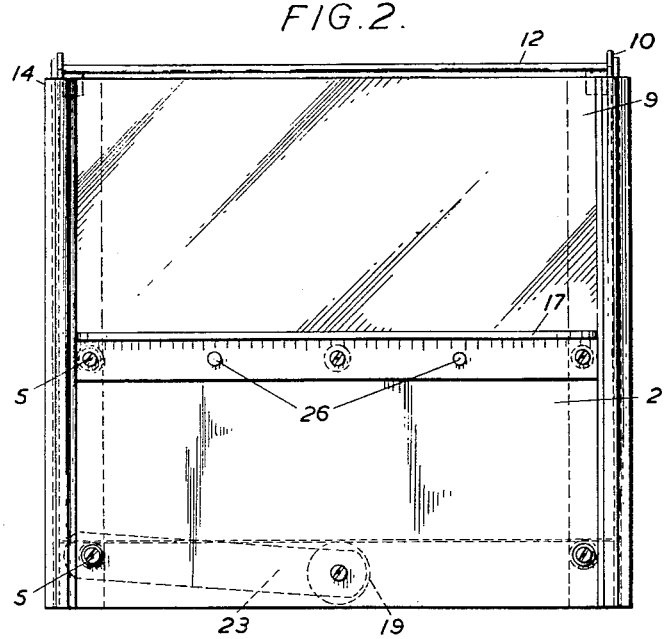
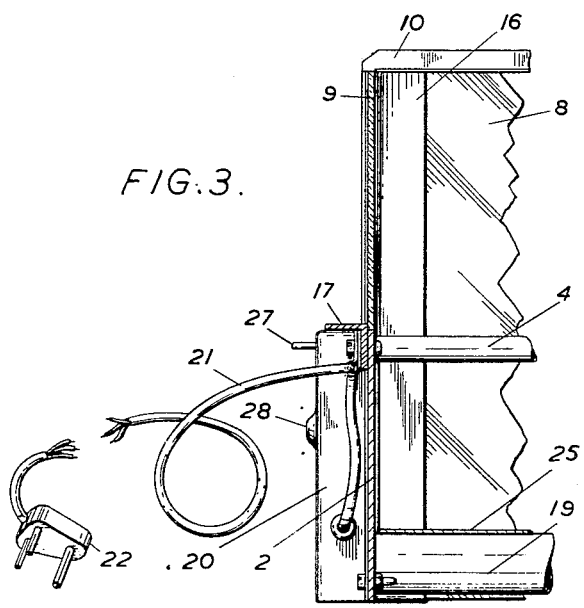
Inventor:
Joseph Atkinson
By
Smith, Michael & Gardiner Attorneys

United States Patent Office 2,715,794
Patented Aug. 23, 1955

2,715,794

PROPAGATORS FOR RAISING PLANTS

Joseph Atkinson, Tulse Hill, London, England

Application December 4, 1953, Serial No. 396,164

Claims priority, application Great Britain December 27, 1952

8 Claims. (Cl. 47—19)

This invention relates to propagators for raising plants.

The object of the invention is to provide a propagator which will be efficient in use, comparatively cheap and simple to manufacture, and advantageous for purposes of transport and/or storage.

With this end in view the invention consists in a propagator for raising plants, in the form of a box-like structure comprising end members held together in spaced relationship by longitudinal members extending between them inside the structure, and means for removably supporting transparent or translucent front and rear walls, and a transparent or translucent roof, for the box-like structure, between the end members. The end members may also be adapted removably to support transparent or translucent end panels.

Each end member may comprise corner posts with a panel extending between them, and the longitudinal members are preferably removably secured to the end members (e. g. being rods or tubes secured to the end member by screws or the like), allowing the structure to be readily disassembled for packing or transit. The longitudinal members may be arranged in series at different heights to serve as supports for seed boxes or the like, or for shelves or trays. The corner posts may be slotted to receive glass walls, and removable ledge-like supports extending from end to end of the structure, adjacent to the front and rear walls, may be provided to carry glass panels forming a roof for the structure. Electrical or other heating means extending inside the propagator may be fitted and if desired may be under thermostat control, and may be adjustable for temperature.

The invention will be clearly understood from the following description of forms (given, however, merely by way of example) which it may assume, and this description will be more readily followed by reference to the accompanying drawings wherein:

Figure 1 represents in perspective one form of plant propagator according to the invention;

Figure 2 represents in end elevation a somewhat modified form of propagator according to the invention;

Figure 3 represents in side elevation a corner of the popagator shown in Figure 2; and Figure 4 represents in perspective, and in enlarged scale details of a corner of the propagator shown in Figures 2 and 3.

In carrying the invention into effect in one convenient manner, as shown in Figure 1 of the drawings herewith, a propagator for rearing plants and the like comprises two end members each in the form of two angle-metal corner posts 1 integral with a metal panel 2 of about half the height of the corner posts extending between their lower portions. The top edge 3 of the panel 2 is turned outwards to form a ledge for lifting the structure. The end members are held apart in spaced relation, parallel to one another, by a plurality of longitudinal members in the form of rods or tubes 4, to which the end members are secured by screws or the like 5 engaging in the ends of the rods or tubes 4. Any desired number of rods or tubes 4 may be employed, and are preferably arranged in two or more series at different levels. For example in the arrangement shown in Figure 1 six tubes 4 are arranged as three equispaced rods near the base of the structure, and three more rods adjacent to the top edges of panels 2, i. e. at about half the overall height of the structure. Internal angled metal members 6 are located inside the angled corner posts 1, and spaced from the corner posts, e. g. by spacing elements between them, to form slots. The inner members 6 are held by the securing screws of the outer rods or tubes 4. Transparent or translucent panels 8 are removably inserted in the slots between the corner posts 1 and inner members 6 to form front and rear walls of the propagator. Similarly transparent or translucent panels 9 of suitable size may be removably inserted in the slots between corner posts 1 and inner members 6 over the panels 2, resting on the spacing elements to form the upper portion of the end walls of the propagator. The transparent or translucent panels may be of glass, or a synthetic resinous material, e. g. cellulose acetate, which may be beaded along its edges for increased rigidity. Angle metal longitudinal elements 10 may have downturned end lugs adapted to fit into the top ends of the slots between corner posts 1 and inner members 6 behind the glass ends panels 9, so that these elements 10, extend one between the front corner posts and the other between the rear corner posts of the two end members. The vertical sides of these elements 10 stand behind and in contact with the top edges of the panels 8, and their inwardly directly horizontal portions form ledges 11 to support a transparent or translucent roof for the propagator. This roof is preferably formed in two half portions 12, which may be provided with metal edging 13, so that by sliding the two halves apart a variable opening of the propagator to atmosphere can be provided for ventilation.

A slightly modified construction of propagator according to the invention is shown in Figures 2, 3 and 4 of the drawings herewith. In this form of the invention four vertical corner posts 14 are formed, e. g. of extruded aluminium, as angled elements in which each wing has an outer strip 15 and an inner strip 16 (Figure 4) formed with a slot between them. Each end member of the propagator is formed of two such corner posts held apart by a panel (such as panel 2 in Figure 1) which, if of metal, may be integral with the corner posts, or if separate may be of wood or metal and may be fitted and secured in the slots of the corner posts. In the latter case the upper edge of the panel is fitted with an out-turned angle piece 17 (Figure 2) to form a gripping ledge similar to the ledge 3 of Figure 1, and fixed in position by rivets 26. If desired the corner posts 14 may be extended and suitably braced to form legs.

The end members thus formed are held apart by longitudinal rods or tubes 4 (as in Figure 1) held by screws or the like which, at the upper level, may also hold the angle piece 17 in position. As seen in Figure 2 three equispaced rods or tubes are provided at the upper edge of the wooden end panel, and three similar equispaced rods or tubes may be provided at the bottom edges of those panels.

As in the form of the invention described with reference to Figure 1 front and rear glass panels 8 are removably fitted into the front and real slots of the corner posts 14, which slots at their lower end may be formed with structures to support the panels; while end glass panels 9 are removably fitted into the end slots of corner posts 14, resting on the lower wooden panel therein. Longitudinal angle-elements 10 have downturned end lugs 18 which fit snugly into the tops of the end slots of corner posts 14 behind the glass panels 9, and these elements 10, as previously described, form ledges for receiving two half-panels of glass to serve as a roof for the propagator. In either form of the invention the top edge(s) of the front and/or rear panels may project slightly above the structure in order to allow easy gripping for removal.

Either of the forms of the invention described above may be fitted with heating means, which may conveniently be located near to, or in or as, one of the tubes 4 of the lower layer. The heating device may be electrical, and comprise for example, one or more electric lamps supported at the base of the structure by brackets and shrouds attached to the end members: or it may comprise a unit of the immersion-heater type, as shown at 19 in Figure 3. Alternatively heating may be effected by one or more hot panels or insulated wire suitably mounted at the base inside the propagator. Such electric heating means are connected to a terminal box 20 secured externally to the mid-point of one end member, provided with a lead 21 and a three-pin plug 22 for connection to an electric supply line. One of the plug pins connects the metal parts of the structure to earth, to avoid shock to an operator, and where necessary (e. g. if wooden end panels are employed) the various metal parts are connected together, by metal strips, such as 23 (Figure 2). The terminal box may incorporate a switch and/or a pilot lamp 28 in circuit with the heater to show when it is in operation. If desired an adjustable thermostat, for the purpose of selecting and/or controlling temperature in circuit with the heater may be suitably located inside the propagator, e. g. in the middle tube of the elements 4 with an external adjusting knob 27 in order to control the air temperature inside the propagator.

Where electricity is not available other heating means may be employed. For example the terminal box 20 may be replaced by a small tank holding water and communicating with the middle lower tube 4, or with several tubes in circuit, and the water in the tank may be heated by suitable means, e. g. a paraffin burner. Alternatively the heater 19 may be replaced by a solid metal rod or block extending through the end member, and heated (e. g. by a burner or by a hot-water tank as mentioned above) at its projecting extremity.

If desired a tube 24 (Figure 1) open at its inner end may be removably fitted to one end panel, projecting into the propagator to receive a thermometer.

In use a propagator such as described above is intended to accommodate pots or boxes containing seeds or young plants under controlled conditions encouraging germination and propagation. The rods or tubes 4 are intended to support the pots or boxes which may rest between them or may extend across them, or if desired one or more metal sheets, such as 25 which may or may not be perforated, may be rested on the rods or tubes to form a shell at either or both levels. The propagator may advantageously be employed with seed-boxes described in the specification of co-pending British patent application No. 7,023/51.

It will be noted from the above description that the various parts of the propagator described can be very easily and readily assembled, and that for transport or storage removal of the spacing rods or tubes 4 release the end members, which with the glass panels and other parts can be substantially flat.

In addition to the features described above a propagator according to the invention may be provided with baffle plates appropriately arranged to influence air flow for uniform (or any other desired) heat distribution. If desired supporting plates, e. g. plates 25, may be formed with apertures to receive pots. A neon or other type of luminescent tube may be mounted inside or outside the propagator to influence the plant growth. In place of glass panels 8, 9, 12 there may be employed sheets of other transparent or translucent material e. g. a synthetic resin.

It should be understood that the invention is not restricted solely to the details of the forms described above which may be modified in order to meet various conditions and requirements encountered without departing in any way from the scope of the invention. For example a bag-like shroud made of transparent or translucent material, e. g. polyvinyl chloride or cellulose acetate, having ventilating apertures with adjustable flaps may be adapted to be removably supported by the corner posts and longitudinal members in order to replace the removable transparent or translucent panels described above.

What I claim is:

1. A propagator for raising plants, in the form of a box-like structure comprising two end members held together in spaced relationship by rigid longitudinal tubular members extending between them inside the structure, one plurality of said longitudinal members being spaced apart at a common lower level, another plurality of said longitudinal members being spaced apart at a common higher level, said longitudinal members thereby serving as supports for seed-trays at different superposed levels within the structure, means for removably supporting light-transmitting front and rear walls and a light-transmitting roof cover for the box-like structure between said end members, an electric heater element located inside one of the tubular longitudinal elements at the lower level, and a thermostat control element, in circuit with said heater element, located inside one of the tubular longitudinal elements at the higher level.

2. A propagator for raising plants, in the form of a box-like structure comprising two end members each end member comprising two corner posts each providing slots formed between angle pieces, and a rigid end wall extending between the lower parts of said two corner posts, the said two end members being held together in spaced relationship by rigid longitudinal members extending between them inside the structure, one plurality of said longitudinal members being spaced apart at a common lower level, another plurality of said longitudinal members being spaced apart at a common higher level, said longitudinal member thereby serving as supports for seed-trays at different superposed levels within the structure, light-transmitting front, rear and end walls respectively extending between said corner posts and vertically slidably supported in said slots of said corner posts, and a light-transmitting roof cover for the box-like structure between said end members.

3. A propagator as claimed in claim 2 wherein the vertically slidable front and rear walls extend upwards past the side edges of the roof cover.

4. A propagator as claimed in claim 2 wherein the roof cover extends over the top edge of the light-transmitting end walls, and is slidable horizontally thereover.

5. A propagator for raising plants, in the form of a box-like structure comprising two end members each formed of two slotted corner posts held apart by a lower rigid wall, a plurality of upper tubular members and a plurality of lower tubular members, all said tubular members extending longitudinally of the structure between said two end members for holding them rigidly together in spaced relationship, two slide members extending between the tops of the corresponding opposite corner posts of said two end members, transparent front and rear walls extending between and vertically slidably mounted in the said slots of said corner posts, transparent end walls extending between and mounted in said slots of said corner posts over said lower rigid walls of said end members, and transparent roof cover means slidably supported on said slides extending between the tops of corresponding opposite corner posts of said two end members.

6. A propagator according to claim 5 wherein at least one of said transparent front and rear walls extends up beside and above a slide supporting the roof cover in order to be grippable for lifting slidably in its slots and thereby allow access to the interior of the structure.

7. A propagator according to claim 5 comprising an electric heating element inside one of said lower tubular members.

8. A propagator according to claim 5 comprising an electric heating element inside one of said lower tubular members, and a thermostat control element, in circuit with said heater element, inside one of said upper tubular elements.

References Cited in the file of this patent

UNITED STATES PATENTS

| Number | Name | Date |
|---|---|---|
| 866,088 | Templin | Sept. 17, 1907 |
| 910,473 | Bales | Jan. 19, 1909 |
| 971,707 | Waters | Oct. 4, 1910 |
| 1,205,028 | Rudolph | Nov. 14, 1916 |
| 1,326,113 | Stuber | Dec. 23, 1919 |
| 1,414,593 | Sklenka | May 2, 1922 |
| 1,912,300 | Parks | May 30, 1933 |
| 1,914,564 | Grandjean | June 20, 1933 |
| 2,526,313 | Zaroban | Oct. 17, 1950 |

FOREIGN PATENTS

| Number | Country | Date |
|---|---|---|
| 330,232 | Great Britain | June 2, 1930 |
| 588,800 | Great Britain | June 3, 1947 |
| 488,055 | Germany | Dec. 19, 1929 |